US010859838B1

(12) United States Patent
Yoon et al.

(10) Patent No.: US 10,859,838 B1
(45) Date of Patent: Dec. 8, 2020

(54) COMPACT HEAD-MOUNTED DISPLAY FOR ARTIFICIAL REALITY

(71) Applicant: Facebook Technologies, LLC, Menlo Park, CA (US)

(72) Inventors: Youngshik Yoon, Cupertino, CA (US); Richard Han Soo Cho, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/578,173

(22) Filed: Sep. 20, 2019

Related U.S. Application Data

(63) Continuation of application No. 15/842,260, filed on Dec. 14, 2017, now Pat. No. 10,466,484.

(51) Int. Cl.
| | | |
|---|---|---|
| G09G 5/00 | (2006.01) | |
| G02B 27/01 | (2006.01) | |
| H04N 13/332 | (2018.01) | |
| G06F 3/01 | (2006.01) | |

(52) U.S. Cl.
CPC ......... *G02B 27/0172* (2013.01); *G06F 3/013* (2013.01); *H04N 13/332* (2018.05); *G02B 2027/0114* (2013.01)

(58) Field of Classification Search
CPC ................................. G06F 3/011; G06F 3/017
See application file for complete search history.

(56) References Cited

U.S. PATENT DOCUMENTS

| | | | | | |
|---|---|---|---|---|---|
| 3,851,949 | A | * | 12/1974 | Kraft | G02B 21/0096 359/388 |
| 2004/0004194 | A1 | * | 1/2004 | Amblard | G01N 21/6458 250/458.1 |
| 2004/0014504 | A1 | * | 1/2004 | Coates | G02B 27/022 455/566 |
| 2012/0050144 | A1 | * | 3/2012 | Morlock | G06F 3/012 345/8 |
| 2013/0194548 | A1 | * | 8/2013 | Francis | A61B 3/12 351/208 |
| 2013/0268096 | A1 | * | 10/2013 | Riddle | G02B 26/06 700/9 |
| 2014/0267771 | A1 | * | 9/2014 | Lawler | G06K 9/00597 348/169 |
| 2015/0316771 | A1 | * | 11/2015 | Border | G02B 6/0001 359/630 |
| 2018/0113508 | A1 | * | 4/2018 | Berkner-Cieslicki | ........ G06T 19/006 |

* cited by examiner

*Primary Examiner* — Nan-Ying Yang
(74) *Attorney, Agent, or Firm* — Fenwick & West LLP

(57) ABSTRACT

A head-mounted display (HMD) includes a dichroic element, an eye tracking system, a controller, and an external focus camera. The dichroic element is transmissive to the light in a first optical band (e.g., visible light) but reflective to light in a second optical band (e.g., IR light). The eye tracking system includes a source assembly and a tracking camera. The source assembly projects light in the second optical band into an eyebox of the HMD. The tracking camera captures images of at least a portion of a user's eye in the eyebox. The controller of the HMD determines a gaze direction of the user based on the captured images. An orientation of the external focus camera corresponds to the gaze direction. The external focus camera captures image data of a portion of a local area surrounding the HMD at the orientation.

18 Claims, 6 Drawing Sheets

ND DISPLAY FOR
COMPACT HEAD-MOUNTED DISPLAY FOR ARTIFICIAL REALITY

CROSS REFERENCE TO RELATED APPLICATIONS

This application is a continuation of co-pending U.S. application Ser. No. 15/842,260, filed Dec. 14, 2017, which is incorporated by reference in its entirety.

BACKGROUND

The present disclosure generally relates to head-mounted display (HMD), and specifically relates to a compact HMD for mixed reality.

Conventional headsets used for presentation of content are quite bulky. And for artificial reality applications is desirable to have a light headset. The display for conventional headsets often includes one or more relatively large panels that provide image light to the eye using a somewhat bulky optical assembly. Accordingly, in order to provide a better user experience it is desirable to reduce form factor, weight, etc., of conventional displays. Moreover, it is desirable to do so in a manner that does not sacrifice brightness of content presented to the user.

SUMMARY

A compact head-mounted display (HMD) is part of an artificial reality system. The compact HMD includes an electronic display, an optics block, an eye tracking system, and a depth camera assembly (DCA) including an external focus camera. The electronic display emits image light in a first optical band (e.g., a visible band). The optics block directs the image light in the first optical band to an eyebox where a user's eye is located. The optics block includes a pancake lens assembly and a dichroic element. The pancake lens assembly directs the image light to an eyebox. The dichroic element is transmissive to the image light in the first optical band, and is reflective to light in a second optical band (e.g., an infrared (IR) band) which is different from the first optical band.

Using light in the second optical band, the eye tracking system tracks positions/orientations of one or both of the user's eyes. The eye tracking system includes a source assembly, a fold mirror, a tracking camera, and a controller. The source assembly projects the light in the second optical band to the eyebox. The dichroic mirror is reflective to light in the second optical band, and for a given eye, and directs the light reflected from eye to the fold mirror. The fold mirror further directs the light to the tracking camera. The tracking camera collects the light and captures one or more images of a portion of the user's eye located in the eyebox. Based on the captured one or more images, the controller determines tracking information of the user's eye, e.g., a gaze direction of the user's eye.

The controller sends the gaze direction to the DCA. The DCA directs the external focus camera to an orientation that corresponds to the gaze direction. At the determined orientation, the external focus camera captures image data of a local area surrounding the compact HMD. In some embodiments, the external focus camera is part of a depth camera assembly that determines depth information of at least a portion of the local area. The electronic display of the compact HMD can emit image light according to the depth information of the local area.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a 3D effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A HMD includes a dichroic element that is transmissive to light in a first optical band but reflective to light in a second optical band. The HMD uses light in the first optical band to present images to a user. For example, the HMD includes an electronic display that emits image light in the first optical band and an optics block that directs the image light to an eyebox where an eye of the user is located. The HMD also uses light in the second optical band to track the user's eye. For example, an eye tracking system of the HMD illuminates the user's eye with the light in the second optical band and determines a gaze direction of the user's eye based on images capturing reflection of the light in the second optical band from the eye. Based on the gaze direction of the user's eye, an orientation of an external focus camera is determined for capturing image data of a local area surrounding the HMD. The image data captured by the external focus camera can be used to determine depth information of the local area. The HMD may present images to the user based on the determined depth information.

Figure 1:
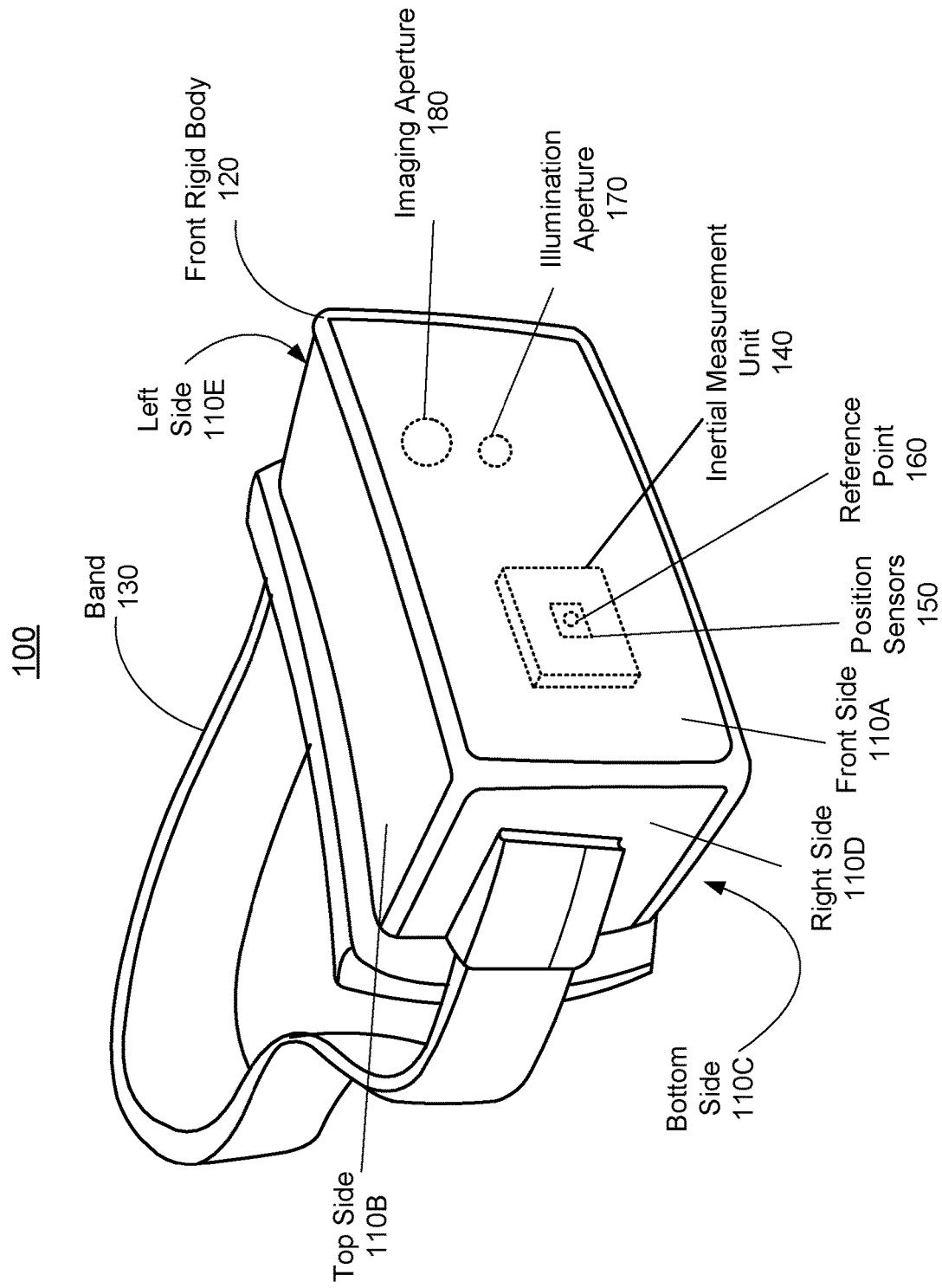
FIG. 1 is a wire diagram of a HMD, in accordance with one or more embodiments.

FIG. 1 is a wire diagram of a HMD 100, in accordance with one or more embodiments. The HMD 100 may be part of an artificial reality system. In some embodiments, portions of the HMD 100 that are between a front side 110A of the HMD 100 and an eye of a user are at least partially transparent (e.g., a partially transparent electronic display). In addition to the front side 110A, the HMD 100 also includes a top side 110B, a bottom side 110C, a right side 110D, a left side 110E, a front rigid body 120, and a band 130. The front rigid body 120 also includes an inertial measurement unit (IMU) 140, the one or more position sensors 150, and a reference point 160. In the embodiment shown by FIG. 1, the position sensors 150 are located within the IMU 140, and neither the IMU 140 nor the position sensors 150 are visible to the user.

The IMU 140 is an electronic device that generates IMU data based on measurement signals received from one or more of the position sensors 150. A position sensor 150 generates one or more measurement signals in response to motion of the HMD 100. Examples of position sensors 150 include: one or more accelerometers, one or more gyroscopes, one or more magnetometers, another suitable type of sensor that detects motion, a type of sensor used for error correction of the IMU 140, or some combination thereof. The position sensors 150 may be located external to the IMU 140, internal to the IMU 140, or some combination thereof.

Based on the one or more measurement signals from one or more position sensors 150, the IMU 140 generates IMU data indicating an estimated position of the HMD 100 relative to an initial position of the HMD 100. For example, the position sensors 150 include multiple accelerometers to measure translational motion (forward/back, up/down, left/right) and multiple gyroscopes to measure rotational motion (e.g., pitch, yaw, or roll). In some embodiments, the IMU 140 rapidly samples the measurement signals and calculates the estimated position of the HMD 100 from the sampled data. For example, the IMU 140 integrates the measurement signals received from the accelerometers over time to estimate a velocity vector and integrates the velocity vector over time to determine an estimated position of a reference point on the HMD 100. The reference point 160 is a point that may be used to describe the position of the HMD 100. While the reference point may generally be defined as a point in space; however, in practice the reference point is defined as a point within the HMD 100 (e.g., a center of the IMU 140).

The HMD 100 also includes a depth camera assembly (DCA). Some embodiments of the DCA include a light projector and an external focus camera. The light projector projects structured light and/or pulses of light towards an object in a local area surrounding the HMD 100. The external focus camera captures light reflected from the object and may also capture ambient light. The HMD 100 shown in FIG. 1 depicts an illumination aperture 170 and an imaging aperture 180. The light projector projects the light (e.g., structured light and/or pulses of light) through the illumination aperture 170. And the external focus camera captures light (e.g., portions of the structured light pattern and/or pulses) reflected from the object through the image aperture 180.

The external focus camera is dynamically positioned such that its orientation matches that of a gaze direction of the user. Accordingly, the external focus camera captures the reflected light at an orientation that corresponds to a gaze direction of a user's eye. The gaze direction of the user's eye is determined by an eye tracking system (not shown in FIG. 1) of the HMD 100. More information about the eye tracking system are described in conjunction with FIG. 4.

Figure 2:
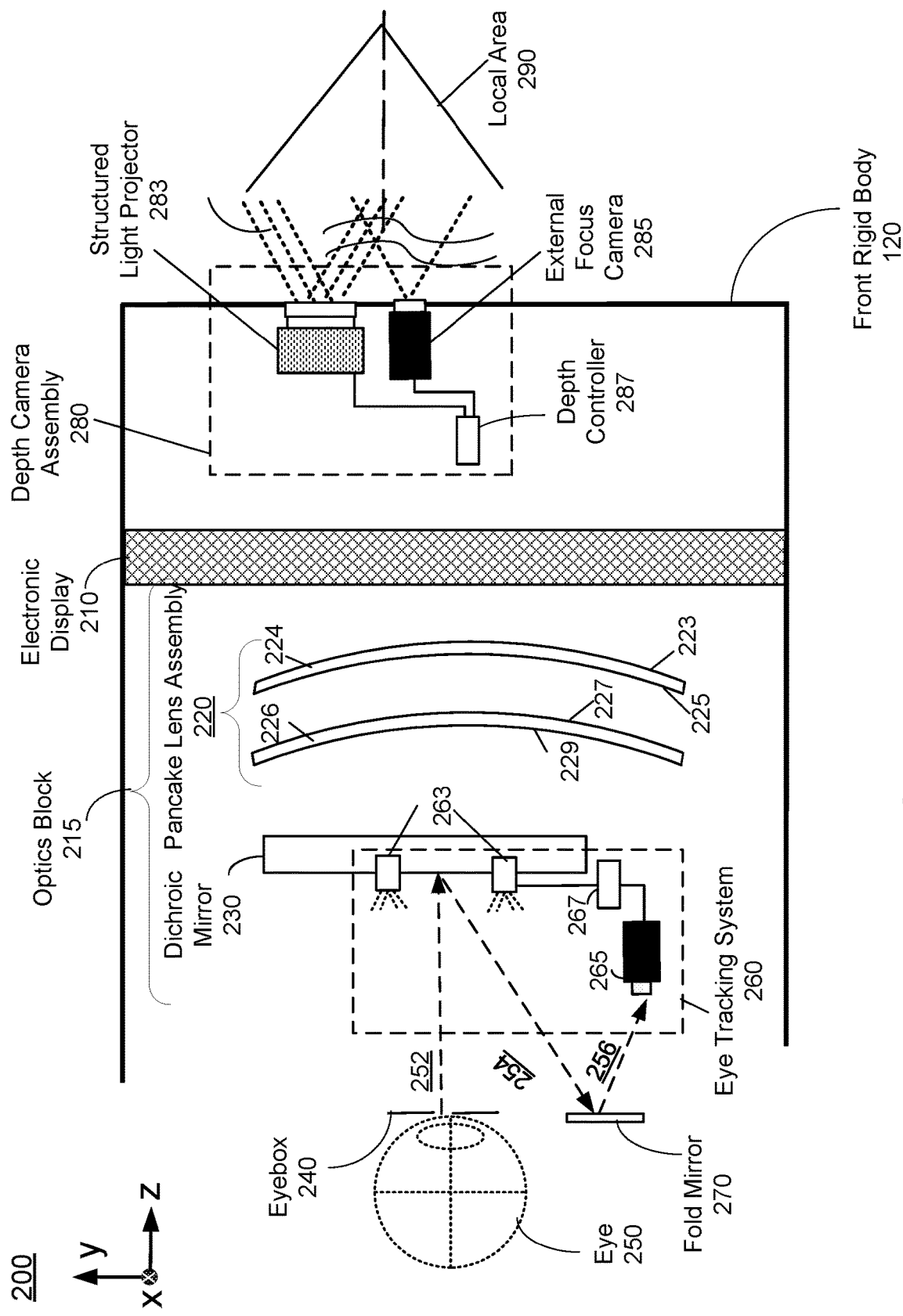
FIG. 2 is a cross section of a front rigid body of the HMD in FIG. 1, in accordance with an embodiment.

FIG. 2 is a cross section 200 of a front rigid body 120 of the HMD 100 in FIG. 1, in accordance with an embodiment. The front rigid body 120 includes an electronic display 210, an optics block 215 including a pancake lens assembly 220 and a dichroic mirror 230, an eye tracking system 260, a fold mirror 270, and a DCA 280. Some embodiments of the front rigid body 120 have different components than those described here. Similarly, in some cases, functions can be distributed among the components in a different manner than is described here.

The electronic display 210 displays 2D or 3D images to the user. The electronic display 210 emits image light in a first optical band. The first optical band includes a visible band (i.e., ~380 nm to 750 nm). Light emitted from the electronic display 210 may be linearly polarized. In some embodiments, the electronic display 210 includes one or more linear polarizers that linearly polarize light is emitted from the electronic display 210. Alternatively, light emitted from light emitting components (e.g., LEDs) of the electronic display 210 is directly emitted as linearly polarized light.

In various embodiments, the electronic display 210 comprises a single electronic display panel or multiple electronic display panels (e.g., a display for each eye of a user). Examples of an electronic display panel include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The pancake lens assembly 220 and dichroic mirror 230 together constitute the optics block 215. The optics block corresponds to a left eye channel and has a first optical axis. For purposes of illustration, FIG. 2 shows a cross section of the front rigid body 120 in accordance with a single left eye 250. A second electronic display 210 and a second optics block, separate from those shown in FIG. 2, may be included in the front rigid body 120 to present content, such as an augmented representation of a local area 290 or virtual content, to a right eye of the user. The second optics block corresponds to a right eye channel and has a second optics axis. The first optical axis and the second optical axis are converting with respect to each other.

The pancake lens assembly 220 directs the image light emitted by the electronic display 210 to an eyebox 240. The eyebox 240 is a region in space that is occupied by the eye 250. For example, the pancake lens assembly 220 directs light from the electronic display 210 to the eyebox 240. The pancake lens assembly 220 includes a back optical element 224 and a front optical element 226. As shown in FIG. 2, the back optical element 224 is adjacent to the electronic display 210, while the front optical element 226 is closer to the eyebox 240 than the back optical element 224 to the eyebox 240.

In some embodiments, one or more surfaces of the front optical element 226 and back optical element 224 are shaped to correct for field curvature. For example, one or more surfaces of front optical element 226 may be shaped to be spherically concave (e.g., a portion of a sphere), spherically convex, a rotationally symmetric sphere, a freeform shape, or some other shape that mitigates field curvature. In some embodiments, the shape of one or more surfaces of the front optical element 226 and back optical element 224 are designed to additionally correct for other forms of optical aberration. In some embodiments, the front optical element 226 or the back optical element 224 may have one or more coatings, such as anti-reflective coatings, to reduce ghost images and enhance contrast.

In the embodiment of FIG. 2, the back optical element 224 includes a waveplate surface 223 and a mirrored surface 225. For example, the waveplate surface 223 is a quarter-waveplate that shifts polarization of received light. A quarter-waveplate includes a polarization axis and the waveplate surface 223 shifts the polarization axis 45 degrees relative to incident linearly polarized light such that the waveplate surface 223 converts linearly polarized light into circularly polarized light. Likewise, a quarter-waveplate converts circularly polarized light incident to the quarter-waveplate into linearly polarized light. Quarter-waveplates can be made of birefringent materials such as quartz, organic material sheets, or liquid crystal.

In other embodiments, instead of being implemented as part of a surface of the back optical element 224, a quarter waveplate is implemented separate from the back optical element 224 and positioned between the electronic display 210 and the back optical element 224. In addition, a linear polarizer (not shown in FIG. 2) may be coupled to the electronic display 210 to generate linearly polarized image light using image light emitted from the electronic display 210.

The mirrored surface 225 of the back optical element 224 is partially reflective to reflect a portion of light incident on the mirrored surface 225. In some embodiments, the mirrored surface 225 is configured to transmit approximately 50% of the incident light and reflect approximately 50% of the incident light.

The front optical element 226 includes a waveplate surface 227 and the reflective polarizer surface 229. The waveplate surface 227 may be implemented as a quarter-waveplate. Alternatively, instead of being implemented as part of a surface of the front optical element 226, a quarter waveplate (not shown in FIG. 2) is implemented separate from the front optical element 226 and positioned between the front optical element 226 and the mirrored surface 225 of the back optical element 224.

The reflective polarizer surface 229 is a partially reflective mirror configured to reflect received light of a first linear polarization orthogonal to a transmission axis of the front optical element 226. The reflective polarizer surface 229 is also configured to transmit received light of a second linear polarization parallel to the transmission axis of the front optical element 226. For example, the reflective polarizer surface 229 may be configured to reflect linearly polarized light with a polarization direction in the y direction, and pass light that is linearly polarized in the x direction. In some embodiments, the reflective polarizer surface 229 has a polarization transmission contrast ratio greater than 100 to 1, e.g., 200:1 or 500:1.

In some embodiments, the pancake lens assembly 220 mitigates field curvature and accordingly acts to reduce pupil swim. Field curvature is an optical aberration that causes a flat object to appear sharp only in a certain part(s) of the frame, instead of being uniformly sharp across the frame. More generally, field curvature is a result of a focal distance of an optics system not perfectly aligning with all the points on a focal plane. Pupil swim is the effect caused by changes in the location of the user's eye 250 within the eyebox 240 resulting in distortions in the content being presented to the user. Correcting for field curvature mitigates pupil swim. The pancake lens assembly 220 mitigates field curvature in an image that is output to the user's eye 250 to reduce pupil swim. Additionally, the pancake lens assembly 220 has a small form factor, is relatively low weight compared to other optical systems designed to remove field curvature and is configured to have a wide field of view. More details regarding the operation of pancake lens assembly 220 are provided below in conjunction with FIG. 3.

The dichroic mirror 230 is substantially transmissive (e.g., >99%) to the image light in the first optical band and substantially reflective (e.g., >99%) to light in the second optical band. The second optical band is different from the first optical band. An example of the second optical band is an infrared (IR) band (i.e., ~750 nm to 1 mm). Other examples of the second optical band are over some other range of wavelengths. The image light emitted by the electronic display 210 is directed by the pancake lens assembly 220 through the dichroic mirror 230 to illuminate the eyebox 240. As discussed in detail below the dichroic mirror 230 is used to direct light in the second optical band for the eye tracking system 260. In some embodiments, one or more surfaces of the dichroic mirror 230 are curved, e.g., to impart optical power to the eye tracking system 260.

The eye tracking system 260 tracks a positions of the eye 250 using light in the second optical band. A position of the eye 250 includes a location of the eye 250, an orientation of the eye 250, or any combination thereof. The eye tracking system 260 includes a source assembly 263, a tracking camera 265, and a controller 267. The source assembly 263 includes a plurality of emitters that project light in the second optical band into the eye box 240. In other embodiments, the source assembly 263 includes fewer or more emitters. An emitter can include light emitting diodes (LEDs), micro-LEDs, or other types of light source. The emitters are coupled to the dichroic mirror 230.

The light in the second optical band is reflected by the eye 250 in the eyebox 240. A portion of the reflected light propagates toward the dichroic mirror 230 as light 252. A portion of the light 252 is further reflected by the dichroic mirror 230 toward the fold mirror 270 as light 254. The fold mirror 270 is at least partially reflective in the second optical band. For example, the fold mirror 270 may be 50% reflective in the second optical band. The fold mirror 270 redirects at least some of the light 254 toward the tracking camera 265 as light 256. In some embodiments, the fold mirror 270 is a dichroic element that is substantially transmissive (e.g., >99%) to the image light in the first optical band and substantially reflective (e.g., >99%) to light in the second optical band. As shown in FIG. 2, the fold mirror 270 is flat. But in some other embodiments, the fold mirror 279 is curved to impart optical power to the eye tracking system 260.

The tracking camera 265 captures one or more images of at least a portion of the eye 250 using the light 256. The tracking camera 265 includes a detector that detects the light in the second optical band in a field of view of the tracking camera 265. In some embodiments, the tracking camera 265 is sensitive to the IR band. In some other embodiments, the tracking camera is sensitive to both the visible band and the IR band.

In some embodiments, the tracking camera 265 is oriented to capture images through the fold mirror 270 of a portion of a face that includes the eye 250 for tracking positions/orientations of a face of the user. For example, the tracking camera 265 is sensitive to the first optical band and the second optical band, and the fold mirror 270 partially transmissive to the first optical band and partially reflective in the second optical band. Accordingly, light in the first optical band reflected from the portion of the user's face can reach the tracking camera 265. The tracking camera 265 can therefore collect the reflected light and captures images of the portion of the user's face in the first optical band (e.g., visible light). In one embodiment, the tracking camera 265 generates separate images of the user's face and eye 250. Images of the user's face is in the first optical band while images of the user's eye 250 are in the second optical band. In another embodiment, the tracking camera 265 interleaves image frames of images in the first optical band (i.e., images of the portion of the face) and images in the second optical band (images of the portion of the eye).

Based on the images captured by the tracking camera 265, the controller 267 determines tracking information of the eye 250 and/or the face. Tracking information includes information indicating a position, movement, depth, inter-pupillary distance between the eye 250 and the other eye of the user, gaze angle of the eye 250, facial expression etc. More information about the eye tracking system 260 are described in conjunction with FIG. 4.

The DCA 280 determines depth information of a portion of the local area 290. The DCA 280 includes a light projector 283, an external focus camera 285, and a depth controller 287.

The light projector 283 illuminates the local area 290 with structured light and/or pulses of light. Structured light represents a known pattern (often grids, dots, or horizontal bars) that is projected on a surface of the object and the pattern appears to be distorted when viewing the surface of the object at a different angle and/or distance. Example structured light patterns include: a dot matrix pattern, a single line pattern, a sinusoid pattern, a multi (spatial) tone pattern, and a grid pattern. Pulses of light (e.g., for use in time of flight depth calculations) are generally diffuse pulses of light, however, in some instances they may be the structured light pattern. The light projector 283 may generate the structured light using, e.g., one or more diffractive optical elements that are illuminated by one or more light sources. A light source may emit light in the visible band (i.e., ~380 nm to 750 nm), in the infrared (IR) band (i.e., ~750 nm to 1 mm), in the ultraviolet band (i.e., 10 nm to 380 nm), some other portion of the electromagnetic spectrum, or some combination thereof. The illuminated one or more diffractive optical elements generate at least one structured light pattern that is then projected onto a surface of an object in the local area.

The external focus camera 285 captures image data of the portion of the local area 290 by collecting light reflected from the local area 290 illuminated by a light projector 283. The external focus camera 285 captures the image data at an orientation that corresponds to the gaze direction of the eye 250 determined by the eye tracking system 270. Thus, the portion of the local area 290 is an area gazed by the user. The electronic display 210 can display images to the eye 250 based on the depth information of the portion of the local area 290 for facilitating mixture of real and virtual worlds.

The depth controller 287 is configured to determine depth information of an object in the portion of the local area 290 using the image data captured by the external focus camera 285. For example, the depth controller 287 uses a known structure of the projected structured light pattern to determine distortions in the structured light pattern caused by shapes of the object in the images and calculates distances between the object and the external focus camera 285. From the distortions, the depth controller 287 attributes depth information to different portions of the image. In some embodiments, the depth controller 287 uses time of flight techniques to determine depth using image data associated with the pulses of light emitted from the light projector 283.

Using the depth information, the depth controller 287 can further update and/or generate a model of the local area. The model may include, e.g., an approximation of a 3D surface of the object. The depth controller 287 can also control how light (e.g., structured light, pulse rate, etc.) is emitted from the light projector 283 and how the tracking camera 285 captures images.

Figure 3:
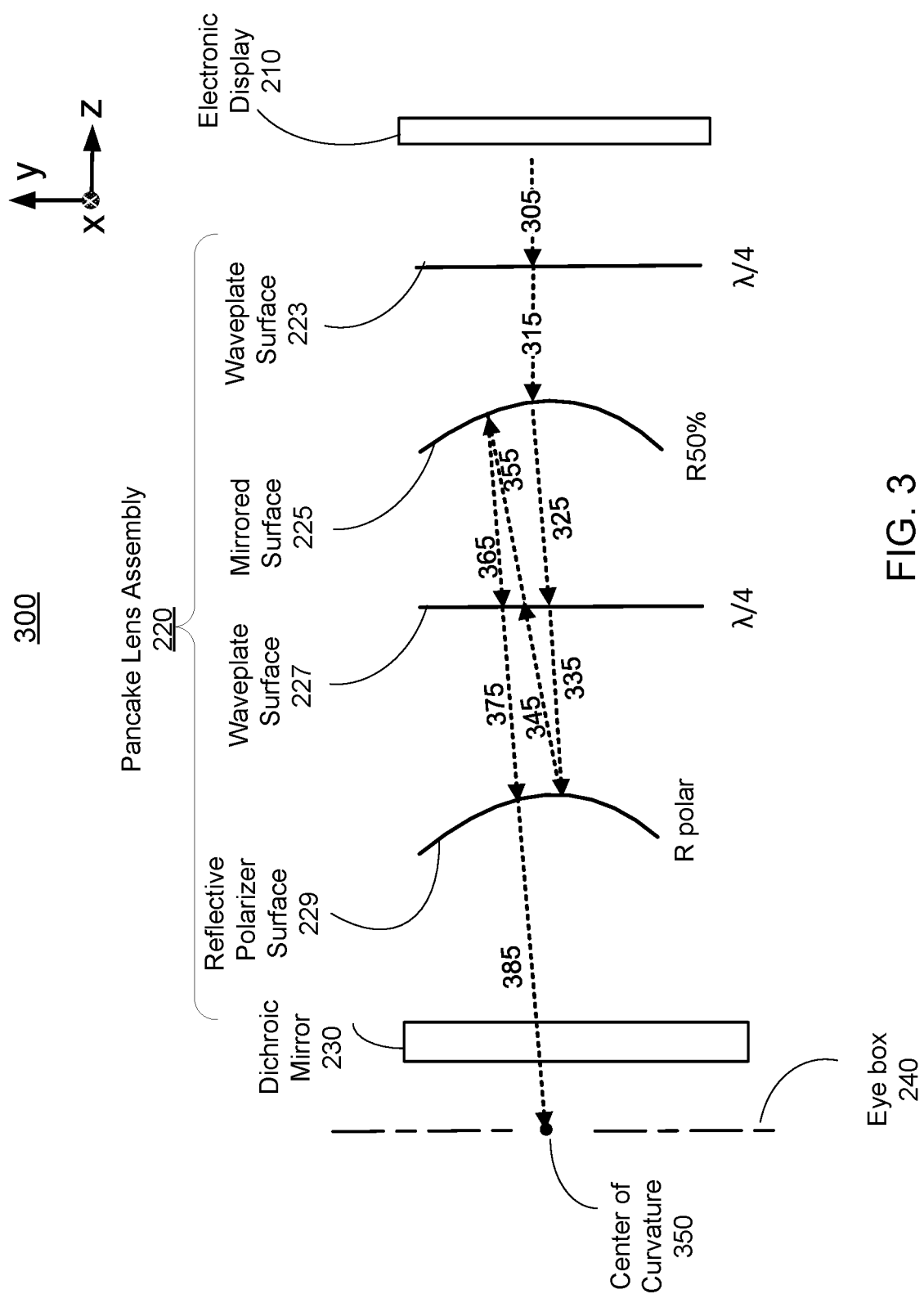
FIG. 3 shows propagation of light in an optics block, in accordance with an embodiment.

FIG. 3 shows propagation of light in an optics block 300, in accordance with an embodiment. The optics block 300 is an embodiment of the optics block 215. Light 305 emitted from the electronic display 210 is in the first optical band and may be linearly polarized. In one embodiment, the electronic display 210 directly emits the light 305 as linearly polarized light. Alternatively, the electronic display 210 is coupled to a linear polarizer (not shown in FIG. 3) that generates the light 305 as linearly polarized light.

The waveplate surface 223 (quarter-waveplate) has an axis 45 degrees or 45 degrees+/−10 degrees (or some other orientation that results in a circularly or elliptically polarized light) relative to the y direction (which is the direction of polarization of the light 305). The orientation of the waveplate axis relative to the incident linearly polarized light controls the handedness of the emitted nonlinearly polarized light. The waveplate surface 223 changes the polarization of the light 305 from linear polarization to circular polarization—shown as light 315. The polarization of the light 315 may be clockwise or anti-clockwise based on the orientation of the axis of the waveplate surface 223 relative to incident linearly polarized light. A first portion of the light 315 is reflected by the mirrored surface 225, and a second portion of light 315 is transmitted by the mirrored surface 225 towards the waveplate surface 227. In some embodiments, the mirrored surface 225 reflects 50% of incident light (e.g., the light 315). Similarly, the waveplate surface 227 is a quarter-waveplate and changes the polarization of the light 315 from circular to linear (referred to as light 335).

The light 335 is incident on the reflective polarizer surface 229, which reflects light that is polarized in a blocking direction (e.g., x direction) and transmits light that is polarized in a perpendicular direction (e.g., y direction). At this point, the light 335 is linearly polarized in the blocking direction. Thus, the reflective polarizer surface 229 reflects the light 335 and the reflected light is referred to as light 345. The waveplate surface 227 changes the linear polarized light 345 to nonlinearly polarized light 355, and the mirrored surface 225 reflects a portion of the polarized light 355, as described above. The reflected portion of light 355 is referred to as light 365.

The light 365 is also nonlinearly polarized; however, its handedness is opposite that of the light 355 and 325 due to the reflection from the mirrored surface 225. Thus, the waveplate surface 227 changes the polarization of nonlinearly polarized light 365 to linearly polarized light 375. However, as the handedness of the light 365 is opposite to that of the light 325, the polarization of the light 375 is perpendicular to that of the light 365. Accordingly, the light 375 is linearly polarized in a direction (e.g., y) perpendicular to the blocking direction (e.g., x) and is therefore transmitted by the reflective polarizer surface 229 as light 385 to the dichroic mirror 230. Because the dichroic mirror 230 is transmissive to the first optical band, the linearly polarized light 385 propagates through the dichroic mirror 230 toward the eye box 240.

Light propagating through the pancake lens assembly 220, thus, undergoes multiple reflections between the back optical element 224 and the front optical element 226 and passes through multiple materials (i.e., waveplates, reflectors, glass, air, etc.) each having different indices of refraction. These materials can be chosen to allow the back optical element 224 and the front optical element 226 to compensate each other to remove field curvature.

Figure 4:
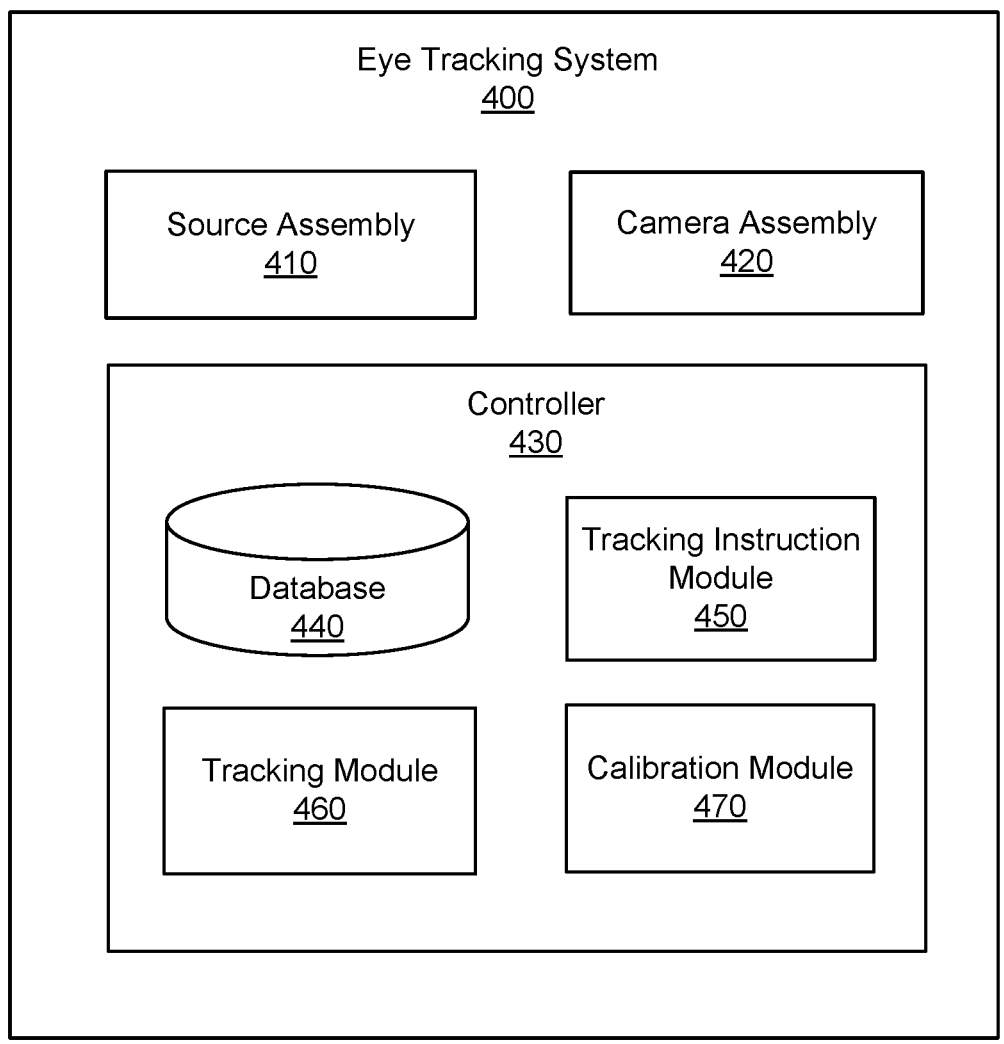
FIG. 4 is a high-level block diagram illustrating a detailed view of an eye tracking system, in accordance with an embodiment.
Figure 5:
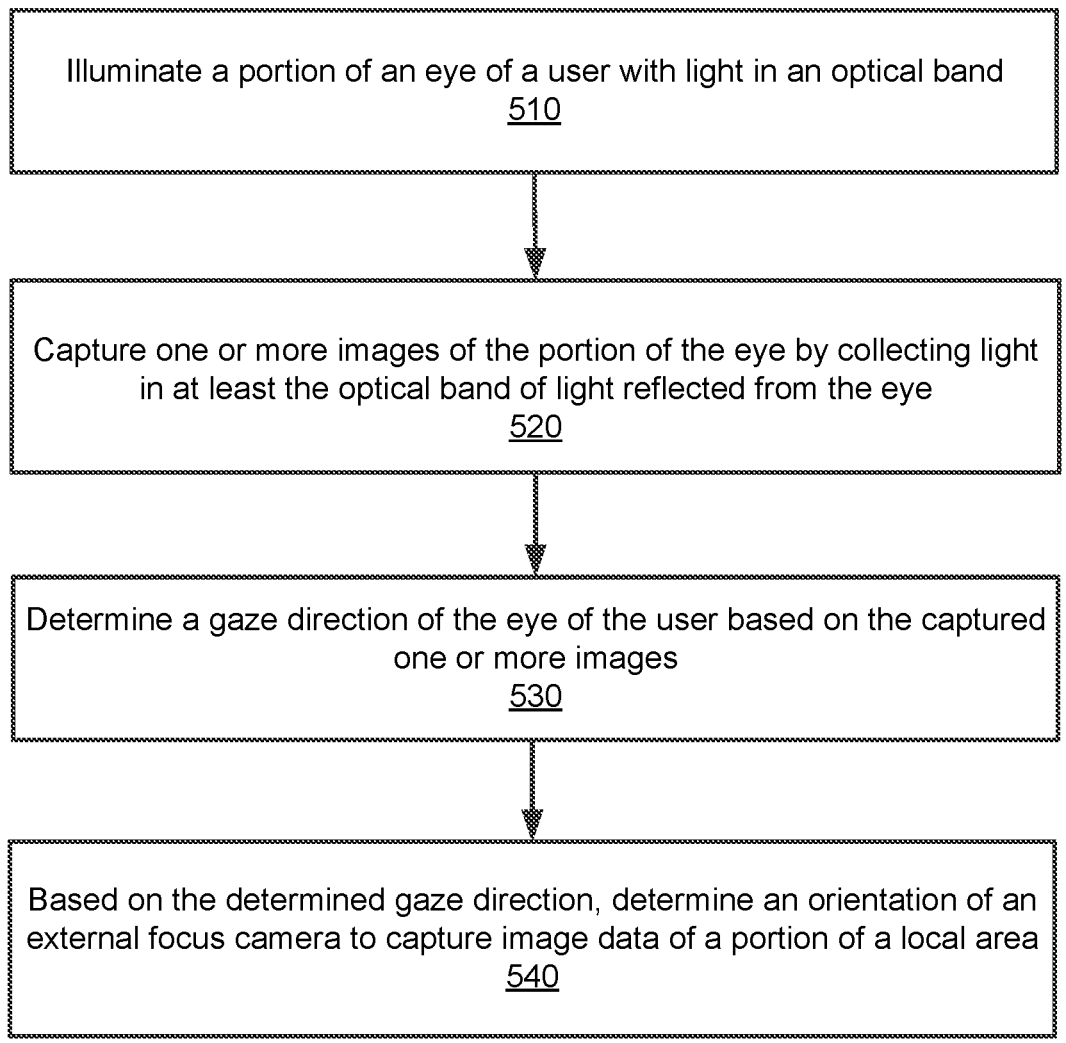
FIG. 5 is a flow chart of a process for tracking a user's eye to determine an orientation of an external focus camera, in accordance with an embodiment.

FIG. 4 is a high-level block diagram illustrating a detailed view of an eye tracking system 400, in accordance with an embodiment. The eye tracking system 400 may be part of a HMD (e.g., the HMD 100) of an artificial reality system. The HMD presents images in a first optical band to a user. The eye tracking system 400 uses light in a second optical band (which is different from the first optical band) to determine eye tracking information of one or both eyes of the user. The eye tracking information may be used to, e.g., determine an orientation of an external focus camera of a DCA (not shown in FIG. 4). An embodiment of the eye tracking system 400 is the eye tracking system 260 described in conjunction with FIG. 2. The eye tracking system 400 includes a source assembly 410, a camera assembly 420, and a controller 430. Some embodiments of the eye tracking system 400 have different components than those described here. Similarly, the functions can be distributed among the components in a different manner than is described here.

The source assembly 410 projects light in the second optical band to an eyebox where a user's eye is located. An example of the second optical band is an IR band. The source assembly 410 includes one or more emitters that emits light in the second optical band. An emitter can include a LED, a micro-LED, vertical cavity surface emitting laser, some other type of light source, or any combination thereof. In one embodiment, the source assembly 410 includes one or more point light sources. In an alternative embodiment, the source assembly 410 projects structured light. For example, the source assembly 410 includes one or more diffractive optical elements that are illuminated by the one or more emitters to generate structured light. Example structured light patterns include: a dot matrix pattern, a single line pattern, a sinusoid pattern, a multi (spatial) tone pattern, and a grid pattern.

The camera assembly 420 captures one or more images of at least a portion of the user's eye. The captured images include reflections of the light in the second optical band from the user's eye. The camera assembly 420 includes one or more tracking cameras (e.g., the tracking camera 265) that capture light in at least the second optical band. A tracking camera may be, e.g., an array (1D or 2D) of photodiodes, a charge coupled display (CCD) array, some other device configured to detect light in at least the second optical band, or some combination thereof. In some embodiments, a tracking camera may also capture light in a first optical band. Alternatively, the camera assembly 420 may include a tracking camera that captures light in the first optical band in addition to a tracking camera that captures light in the second optical band. The camera assembly 420 captures the images in accordance with tracking instructions generated by the controller 430.

In some embodiments, the one or more tracking cameras of the camera assembly 420 are oriented to capture images of a portion of a face of the user for tracking positions/orientations of a face of the user. The images of the user's face may capture reflections of ambient light and/or light in the first optical band from the user's face. In one embodiment, the camera assembly 420 generates separate images of the user's face and eye. In another embodiment, the camera assembly 420 interleaves image frames of images in the first optical band (i.e., images of the portion of the face) and images in the second optical band (images of the portion of the eye). More details regarding how the camera assembly 420 captures the images are described in conjunction with the controller 430 below.

The controller 430 controls the source assembly 410 and the camera assembly 420. The controller 430 also determines tracking information of the user's eye and face using images captured by the camera assembly 420.

In the example shown by FIG. 4, the controller 430 includes a database 440, a tracking instruction module 450, a tracking module 460, and a calibration module 470. These modules are software modules implemented on one or more processors, dedicated hardware units, or some combination thereof. Some embodiments of the controller 430 have different components than those described in conjunction with FIG. 4. Similarly, functions of the components described in conjunction with FIG. 4 may be distributed among other components in a different manner than described in conjunction with FIG. 4. For example, some or all of the functionality described as performed by the controller 430 may be performed by a HMD console.

The database 440 stores data generated and/or used by the eye tracking system 400. The database 440 is a memory, such as a ROM, DRAM, SRAM, or some combination thereof. The database 440 may be part of a larger digital memory of a HMD system. In some embodiments, the database 440 stores image data from the camera assembly 420, baseline data from the calibration module 470 describing trained or established baseline prior to depth measurement, depth information, and analysis data from the tracking module 460 describing characterization parameters. In some embodiments, the database 440 may store calibration data and/or other data from other components.

The database 440 also stores models of the user's eye and face, of which the camera assembly 420 captures images. The model is used to compare to the image captured by the camera assembly 420 to determine tracking information of the eye and face. A model stored in the database 440 can be a 3D model which approximates a surface geometry of the eye or face. More information about a model used for tracking is disclosed in U.S. Patent Application No. 62/249,852, hereby incorporated by reference in its entirety.

The tracking instruction module 450 controls the source assembly 410. The tracking instruction module 450 is a software module implemented on one or more processors, a dedicated hardware unit, or some combination thereof. In some embodiments, the tracking instruction module 450 generates or updates a model of the eye based on the one or more images. Then the HMD 100 compares the 3D approximation with a model of the eye to determine the gaze direction of the eye.

The HMD 100 determines 540 an orientation of an external focus camera. The orientation of the external focus camera corresponds to the gaze direction of the eye. The HMD 100 directs the external focus camera to capture image data of a portion of a local area at the determined orientation. In some embodiments, the orientation of the external focus camera is determined to align with the gaze direction of the eye. Thus, the external focus camera captures image data of an area where the user is looking at.

Figure 6:
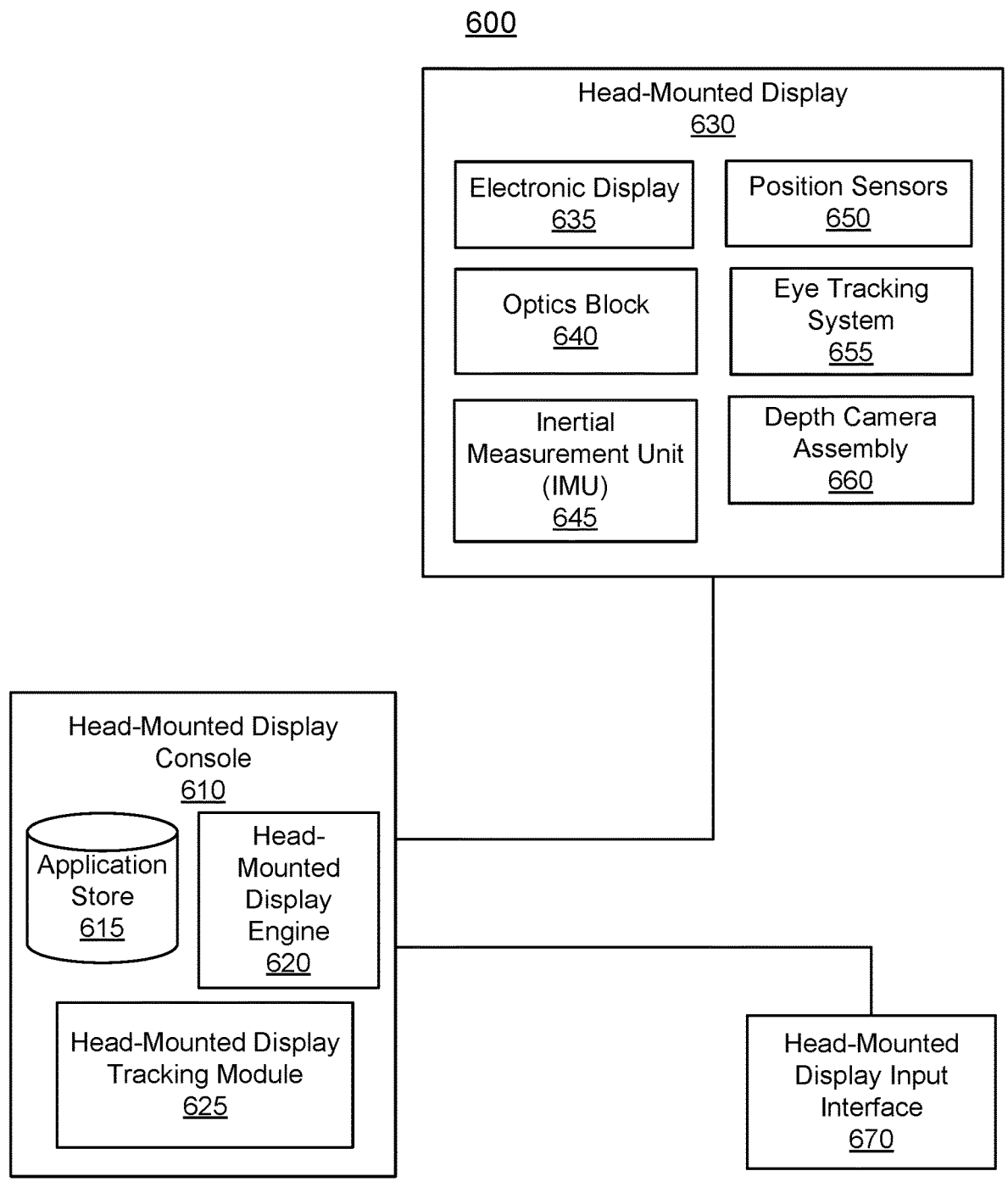
FIG. 6 is a block diagram of a HMD system environment, in accordance with an embodiment.

FIG. 6 is a block diagram of a HMD system environment, in accordance with an embodiment. The HMD system 600 may operate in an artificial reality environment. The HMD system 600 shown by FIG. 6 comprises a HMD console 610 coupled to a HMD 630 and a HMD input/output (I/O) interface 670. While FIG. 6 shows an example system 600 including one HMD 630 and one HMD I/O interface 670, in other embodiments any number of these components may be included in the system 600. For example, there may be multiple HMDs 630, each having an associated HMD I/O interface 670 and communicating with the HMD console 610. In alternative configurations, different and/or additional components may be included in the system environment 600. Similarly, functionality of one or more of the components can be distributed among the components in a different manner than is described here. For example, some or all of the functionality of the HMD console 610 may be contained within the HMD 630.

The HMD 100 in FIG. 1 is an embodiment of the HMD 630. The HMD 630 includes an electronic display 635, an optics block 640, an IMU 645, one or more position sensors 650, an eye tracking system 655, and a DCA 660. In some embodiments, the HMD 630 may also optionally include locators. Some embodiments of the HMD 630 have different components than those described here.

The electronic display 635 displays 2D or 3D images to the user in accordance with data received from the HMD console 610. An embodiment of the electronic display 635 is the electronic display 210 described in conjunction with FIG. 2. The electronic display 635 emits light in a first optical band, e.g., a visible band. In various embodiments, the electronic display 635 comprises a single electronic display element (e.g., the electronic display element 210) or multiple electronic displays (e.g., a display for each eye of a user). Examples of the electronic display element include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, some other display, or some combination thereof.

The optics block 640 receives light from the electronic display and directs the light to an eyebox of the HMD 630. An embodiment of the optics block 640 is the optics block 215 described in conjunction with FIG. 2. In some embodiments, the optics block 640 magnifies received light from the electronic display 635, corrects optical errors associated with the image light, and the corrected image light is presented to a user of the HMD 630. The optics block 640 is an optical element, such as an aperture, a Fresnel lens, a convex lens, a concave lens, a filter, or any other suitable optical element that affects the image light emitted from the electronic display 635. Moreover, the optics block 640 may include combinations of different optical elements. In some embodiments, one or more of the optical elements in the optics block 640 may have one or more coatings, such as partial reflectors or anti-reflective coatings.

Magnification of the image light by the optics block 640 allows the electronic display 635 to be physically smaller, weigh less, and consume less power than larger displays. Additionally, magnification may increase a field of view of the displayed media. For example, the field of view of the displayed media is such that the displayed media is presented using almost all (e.g., 110° diagonal), and in some cases all, of the user's instantaneous field of view. In some embodiments, the effective focal length the optics block 640 is larger than the spacing to the electronic display 635. Consequently, the optics block 640 magnifies the image light projected by the electronic display 635. Additionally, in some embodiments, the amount of magnification may be adjusted by adding or removing optical elements.

The optics block 640 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 635 for display is pre-distorted, and the optics block 640 corrects the distortion when it receives image light from the electronic display 635 generated based on the content.

An embodiment of the IMU 645 is the IMU 140 described in conjunction with FIG. 1. In some embodiments, the IMU 645 receives one or more calibration parameters, e.g., from the HMD console 610. The one or more calibration parameters are used to maintain tracking of the HMD 630. Based on a received calibration parameter, the IMU 645 may adjust one or more IMU parameters (e.g., sample rate). In some embodiments, certain calibration parameters cause the IMU 645 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The eye tracking system 655 is configured to track the user's eye. The eye tracking system includes a source assembly, a tracking camera, and a controller. The source assembly emits light in a second optical band (which is different from the first optical band emitted by the electronic display 635) to illuminate at least a portion of the user's eye. The tracking camera collects light reflected from the user's eye to capture images of at least a portion of the eye. Based on the captured images, the controller determines tracking information of the eye. For example, the controller compares a model of the eye with a surface approximation of the eye derived from the captured images and determines a gaze direction of the eye. The eye tracking system 655 can send the gaze direction of the eye to the DCA 660 to determine an orientation of an external focus camera included in the DCA 660.

An embodiment of the eye tracking system 655 is the eye tracking system 400 described in conjunction with FIG. 4. In some other embodiments, the functions of the eye tracking system 400 may be distributed among other components in the HMD system environment 600 in different manners in other embodiments. For example, some or all of the functionality provided by the controller 430 may be performed by the HMD console 610. Alternatively, some of the control and processing modules of the eye tracking system 400 are part of the HMD 630, and others are part of the HMD console 610.

The DCA 660 determines depth information of an object in a local area surrounding the HMD 630. In some embodiments, the DCA 660 is the DCA 280 described in FIG. 2. The DCA 660 includes a light projector (e.g., structured light, time of flight, or some combination thereof), an external focus camera, and a controller. In some embodiments, the light projector projects a light (e.g., a structured light pattern and/or pulses of light) to illuminate the object. The external focus camera captures images of the object at the orientation determined based on the eye's gaze direction. Based on the captured images of the object, the controller analyzes, e.g., a distortion of the structured light pattern caused by a shape of the object's surface and geometry and/or uses time of flight techniques to generate depth information for the object. The DCA 660 outputs depth information of the object, e.g., to the HMD console 610 for determining content to be presented to the user by the HMD 630.

The HMD I/O interface 670 is a device that allows a user to send action requests to the HMD console 610. An action request is a request to perform a particular action. For example, an action request may be to start or end an application or to perform a particular action within the application. The HMD I/O interface 670 may include one or more input devices. Example input devices include: a keyboard, a mouse, a game controller, or any other suitable device for receiving action requests and communicating the received action requests to the HMD console 610. An action request received by the HMD I/O interface 670 is communicated to the HMD console 610, which performs an action corresponding to the action request. In some embodiments, the HMD I/O interface 670 may provide haptic feedback to the user in accordance with instructions received from the HMD console 610. For example, haptic feedback is provided when an action request is received, or the HMD console 610 communicates instructions to the HMD I/O interface 670 causing the HMD I/O interface 670 to generate haptic feedback when the HMD console 610 performs an action.

The HMD console 610 provides media to the HMD 630 for presentation to the user in accordance with information received from the HMD 630 and/or the target object 110. In the example shown in FIG. 6, the HMD console 610 includes an application store 615, a HMD tracking module 625, and a HMD engine 630, and a selective tracking system 140. Some embodiments of the HMD console 610 have different modules than those described in conjunction with FIG. 6. Similarly, the functions further described below may be distributed among components of the HMD console 610 in a different manner than is described here.

The application store 615 stores one or more applications for execution by the HMD console 610. An application is a group of instructions, that when executed by a processor, generates content for presentation to the user. Content generated by an application may be in response to inputs received from the user via movement of the HMD 630 or the target object 110. Examples of applications include: gaming applications, conferencing applications, video playback application, or other suitable applications.

The HMD tracking module 625 calibrates the HMD system 600 using one or more calibration parameters and may adjust one or more calibration parameters to reduce error in determination of the position of the HMD 630. Moreover, calibration performed by the HMD tracking module 625 also accounts for information received from the IMU 140. Additionally, if tracking of the HMD 630 is lost, the HMD tracking module 625 re-calibrates some or all of the HMD system 600.

The HMD tracking module 625 tracks movements of the HMD 630. The HMD tracking module 625 determines positions of a reference point of the HMD 630 using position information from IMU data. In some embodiments, the HMD tracking module 625 may use portions of the IMU data to predict a future location of the HMD 630. Additionally or alternatively, the HMD tracking module 625 may use depth information generated by the DCA 660 to track movement of the HMD 630. For example, the DCA 660 generates depth information of an object that is still as to a local area surrounding the HMD 630. Using the positions of the object, the HMD tracking module 625 can determine movements of the object relative to the HMD 630, which is opposite to movements of the HMD 630 in the local area. The HMD tracking module 625 provides the estimated or predicted future position of the HMD 630 to the HMD engine 630.

The HMD engine 630 executes applications within the HMD system 600 and receives depth information, position information, acceleration information, velocity information, predicted future positions, or some combination thereof of the HMD 630 from the HMD tracking module 625. Based on the received information, the HMD engine 630 determines content to provide to the HMD 630 for presentation to the user. For example, if the received depth information indicates that an object has moved further from the HMD 630, the HMD engine 630 generates content for the HMD 630 that mirrors the object's movement in an augmented reality environment. Additionally, the HMD engine 630 performs an action within an application executing on the HMD console 610 in response to an action request received from the HMD I/O interface 670 and provides feedback to the user that the action was performed. The provided feedback may be visual or audible feedback via the HMD 630 or haptic feedback via the HMD I/O interface 670.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    an optics block configured to direct light of a display image in a first optical band to an eyebox, the optics block comprising a dichroic element that is transmissive to the light of the display image in the first optical band and is reflective to light in a second optical band that is different than the first optical band;
    a source assembly comprising a plurality of emitters that are configured to project light in the second optical band toward the eyebox;
    a mirror that is at least partially reflective in the second optical band and partially transmissive in the first optical band, the mirror positioned to direct light in the second optical band reflected from dichroic element to a first position, the mirror, source assembly, and the dichroic element are positioned such that light in the second optical band is relayed by the dichroic element and the mirror to the first position in response to a first reflective object being placed in the eyebox;
    a camera located in the first position that is configured to:
        capture one or more images of the first reflective object based on the light in the second optical band relayed by the dichroic element and the mirror,
        capture one or more images of a second reflective object based on light in the first optical band that is reflected by the second reflective object and passes through the mirror to reach the camera, and
        interleave image frames of the one or more images of the first reflective object and the one or more images of the second reflective object; and
    a controller configured to determine a gaze direction of a user based in part on the one or more images of the first reflective object.

2. The system of claim 1, wherein the second reflective object is a portion of a face of the user.

3. The system of claim 1, wherein the first reflective object is an eye of the user.

4. The system of claim 2, wherein the controller is further configured to determine a facial expression of the user based on the one or more images of the second reflective object.

5. The system of claim 1, further comprising:
    an external focus camera configured to capture images of a local area surrounding the user;
    wherein the controller is further configured to determine depth information for a portion of the local area based on images of the local area captured by the external focus camera.

6. The system of claim 5, further comprises an electronic display configured to emit the light in the first optical band based on the depth information for the local area.

7. The system of claim 1, further comprising an electronic display configured to emit the light in the first optical band for displaying images to the user, wherein the light is directed by the optical block through the dichroic element to illuminate the eyebox.

8. The system of claim 7, wherein the images displayed to the user are generated based on the determined gaze direction of the user.

9. The system of claim 7, wherein an image displayed by the electronic display is a mixture of a virtual image and an image of a local area surrounding the user that is captured by an external focus camera.

10. The system of claim 9, wherein the external focus camera is configured to capture the image of the local area at an orientation matching the determined gaze direction of the user.

11. The system of claim 1, wherein the optics block includes a pancake lens assembly.

12. The system of claim 11, wherein the dichroic element includes at least one curved surface to provide optical power to the optics block.

13. The system of claim 11, wherein the mirror is curved to impart optical power to the camera.

14. The system of claim 1, wherein the optics block corresponds to a left eye channel and has a first optical axis, and the system further comprises a second optics block that correspond to a right eye channel and has a second optical axis, wherein the first optical axis and the second optical axis are converging with respect to each other.

15. The system of claim 1, wherein the first optical band is a visible band of light.

16. The system of claim 1, wherein and the second optical band is an infrared band of light.

17. The system of claim 1, wherein the emitters of the source assembly are coupled to the dichroic element.

18. The system of claim 17, wherein the emitters of the source assembly are arranged on the dichroic element.

* * * * *